United States Patent [19]

Oltean

[11] Patent Number: 4,893,664
[45] Date of Patent: Jan. 16, 1990

[54] WHEEL END VALVE FOR CENTRAL TIRE INFLATION SYSTEM

[75] Inventor: Jerry M. Oltean, Windsor, Canada
[73] Assignee: Eaton Corporation, Cleveland, Ohio
[21] Appl. No.: 243,005
[22] Filed: Sep. 12, 1988
[51] Int. Cl.$^4$ .............................................. B60C 29/00
[52] U.S. Cl. .................................. 152/416; 152/415; 137/859
[58] Field of Search .............. 152/415, 416, 417, 427; 137/517, 859, 845

[56] References Cited

U.S. PATENT DOCUMENTS 4,678,017  7/1987  Schultz .................................. 152/415

Primary Examiner—Robert A. Dawson
Assistant Examiner—Gregory J. Wilber
Attorney, Agent, or Firm—P. S. Rulon

[57] ABSTRACT

An improved wheel end valve assembly (11) for a central tire inflation system (10) having a single connection (68) to a tire chamber (74) and a single supply connection (62) to a source (142) of pressurized fluid, which requires no venting other than through the single supply connection (62), is effective in response to pressurization and venting of the single supply connection (62) to open and close communication to the tire chamber (74), a second valve means (288) to isolate the tire chamber if inflation pressure thereof falls below a minimum reference pressure, and a third valve means (300 or 400). The third valve means comprises a controlled bleed of air between the single supply connection and an isolation circuit (264, 254, 256, 266-276) by an elastomeric one way valve.

4 Claims, 5 Drawing Sheets

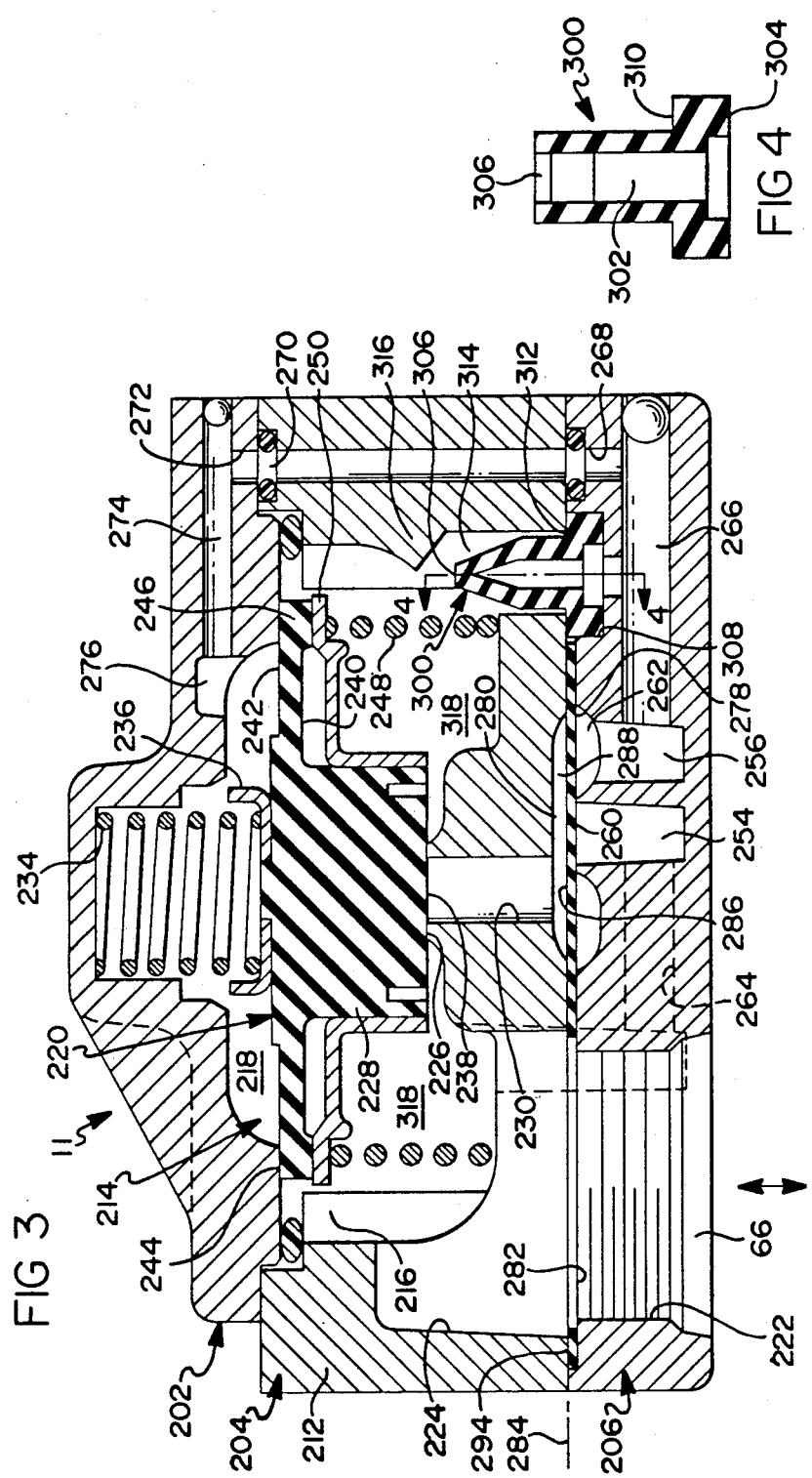

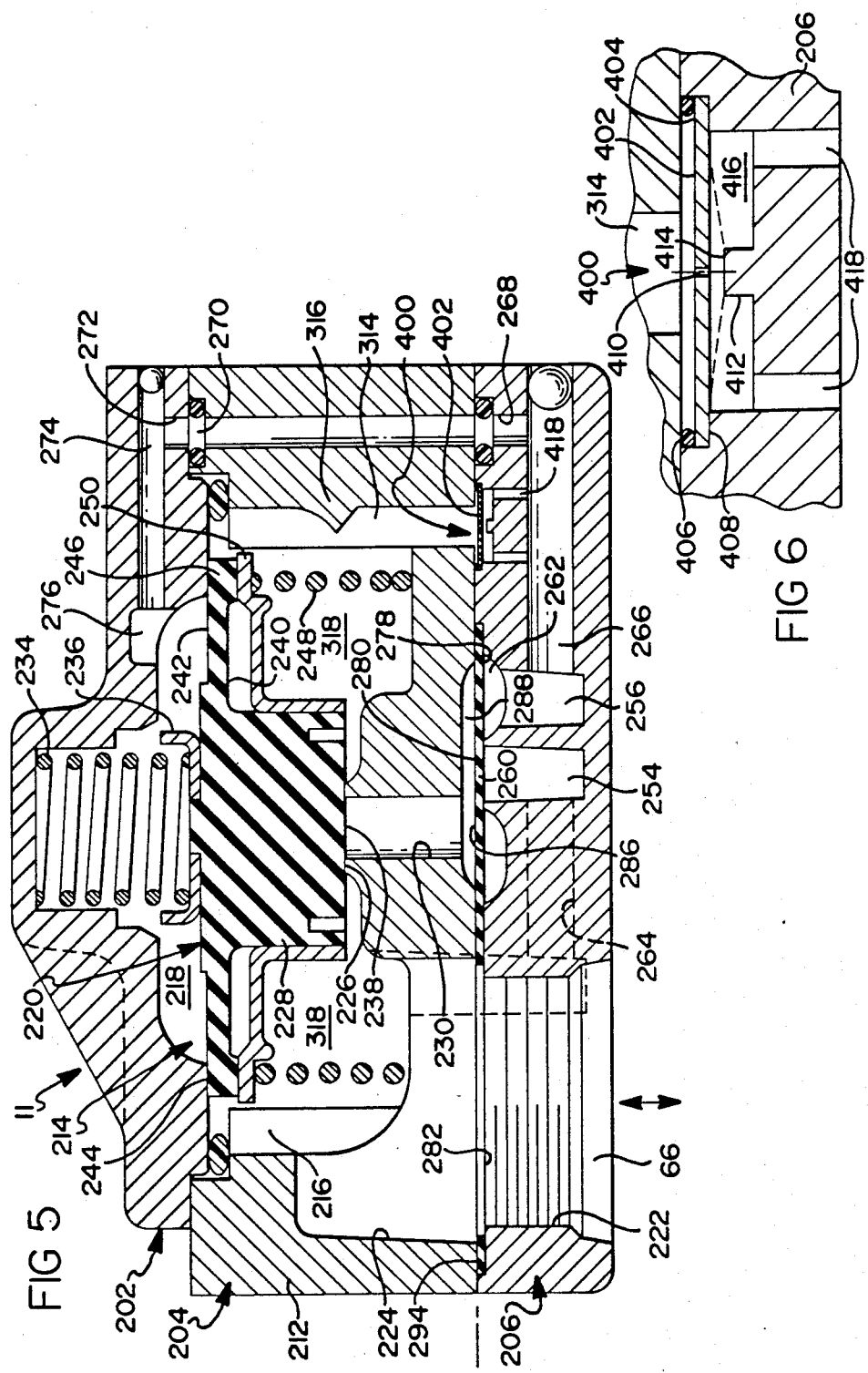

WHEEL END VALVE FOR CENTRAL TIRE INFLATION SYSTEM

The present invention relates to central tire inflation systems (CTIS), also known as onboard inflation systems and tire traction systems, wherein the inflation pressure of one or more vehicle tires may be controlled from a remote location (usually the vehicle cab) with the vehicle at rest and/or in motion and utilizing an onboard source of pressurized fluid (usually compressed air from the vehicle air brake compressor and/or a compressed air reservoir). In particular, the present invention relates to an improved wheel end valve mountable at the tire rim which is vented only through the single conduit connecting same to the system control valves, which is effective to open and close in response to fluid pressure in the single conduit and which is effective to automatically fluidly isolate a tire when the pressure in the tire is less than a minimum reference pressure.

Wheel end valves are well-known in the art as may be seen by U.S Pat. Nos. 4,434,833, 4,678,017 and 4,724,879, the disclosures of which are hereby incorporated by reference While wheel end valves for CTIS are known, these valves are not totally satisfactory. The prior art valves have limited temperature capability so that air trapped in the isolation circuit at low temperatures tends to prevent the isolation circuit from automatically isolating a damaged tire.

In accordance with the present invention, the drawbacks of the prior art wheel end valves have been minimized or eliminated by providing a wheel end valve assembly which requires only a single connection to pressurized fluid, which will automatically isolate a tire having less than a predetermined minimum reference pressure from the remainder of the system, which requires no venting to atmosphere at the vehicle wheel assembly, and which provides for venting of the isolation circuit through the control circuit.

The wheel end valve assembly defines a body having only two ports, one connected to the interior of the tire and the other to the system supply conduit. The low tire pressure shutoff valve is effective to automatically isolate the tire associated therewith from the remainder of the central tire inflation system when the inflation pressure thereof is below a predetermined minimum reference value.

Accordingly, it is an object of the present invention to provide an improved wheel end valve assembly for a central tire inflation system having a single connection to the tire chamber and a single connection to the source of pressurized fluid, which requires no venting other than through the single supply conduit, is effective in response to pressurization and venting of the supply conduit to open and close communication to the tire, and to isolate the tire if inflation pressure thereof falls below a minimum reference pressure and permits a controlled bleed of air between the control circuit and the isolation circuit.

These and other objects and advantages of the present invention will become apparent from a reading of the following description of the preferred embodiments taken in connection with the attached drawings.

FIG. 3 is a partial sectional view of the valve assembly illustrated in FIG. 1 taken along the lines 3—3 in FIG. 2.

FIG. 4 is a sectional view of the valve element of the present invention taken along the lines 4—4 of FIG. 3.

FIG. 5 is a view similar to FIG. 3 of another embodiment of the valve assembly.

FIG. 6 is an enlarged view of a portion of the valve assembly in FIG. 5.

Figure 7:
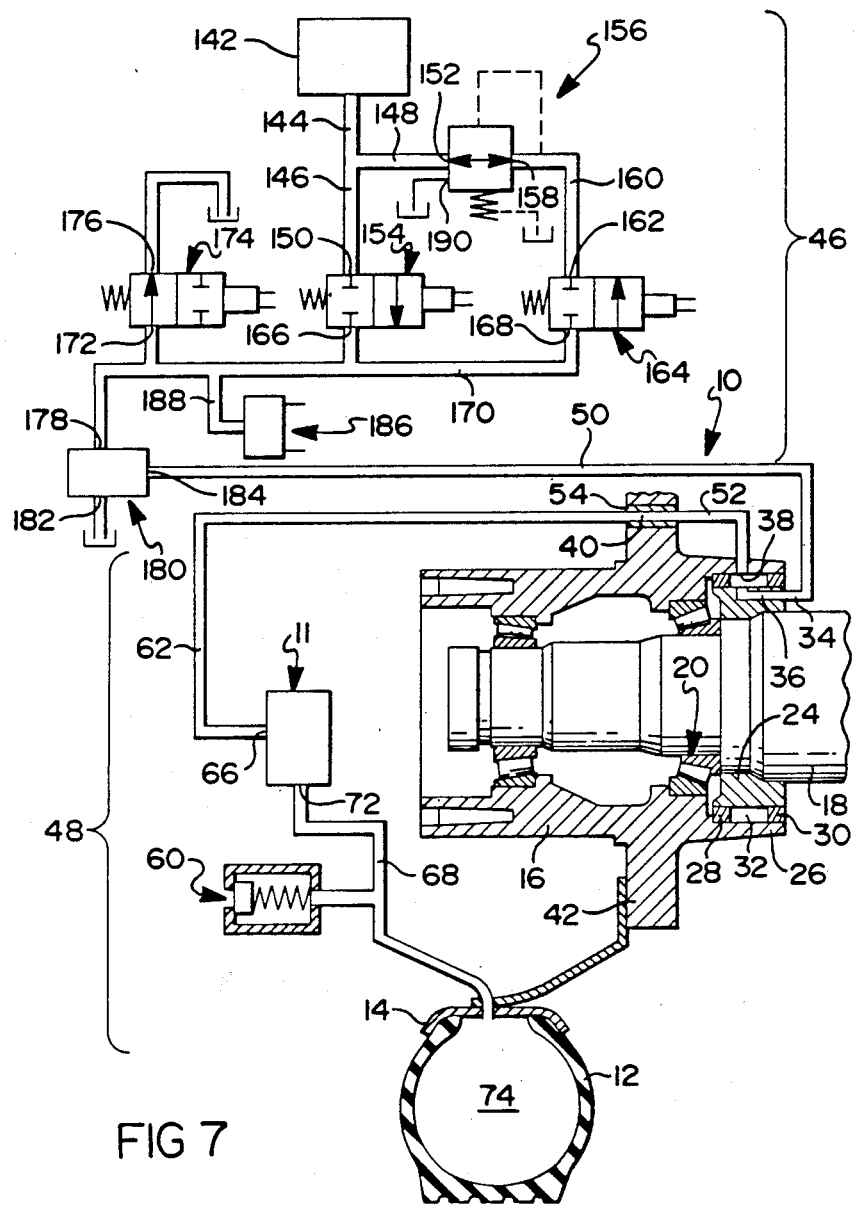
FIG. 7 is a schematic illustration of the pneumatic components of the CTIS in which the present invention is utilized to control the inflation of a single tire.

Referring to FIG. 7, an inflatable tire 12 is mounted to a tire rim 14 which is fixed to a wheel hub assembly 16 rotationally supported on the outer end of an axle housing 18 by means of bearings 20. An axle shaft rotationally driven by conventional means, such as a differential (not shown), extends from the axle housing 18 and typically includes a flange (not shown) for drivingly connecting the axle shaft to the wheel hub. As may be seen in greater detail by reference to U.S. Pat. No. 4,678,017, assigned to the Assignee of this invention, an annular sleeve 24 may be pressed to the axle housing at a location inboard of the bearings 20 and the wheel hub may define an inboardly extending sleeve-type annular flange 26 telescopically surrounding sleeve 24. A pair of rotary seals 28 and 30 extend radially between the outer periphery of sleeve 24 and the inner periphery of sleeve-type flange 26 to define an annular sealed chamber 32 therebetween. Sleeve 24 is provided with an inlet 34 and a passage 36 opening to the chamber 32. Sleeve-type flange 26 is provided with a generally radially extending passage 38 extending from the sealed annular chamber 32 to the exterior outer diameter surface thereof. A single passage 40 may be provided in the radial flange portion 42 of the wheel hub 16 for passage of a pressure conduit. It is understood, of course, that the present invention is equally applicable to wheel hub/axle housing assemblies (also called "wheel-end assemblies") of other constructions.

The central tire inflation system 10 may be considered to comprise two components, a stationary component 46 fixed to the vehicle chassis and a rotational component 48 rotationally fixed to the wheel hub 16 and tire 12. The stationary component 46 is fluidly connected to the rotational component 48 by means of the annular chamber 32 defined by the rotary seals 28 and 30. Briefly, fluid conduit 50 from the stationary component 46 is fluidly connected to the inlet 34 of passage 36 formed in sleeve 24 while fluid conduit 52 leading to the rotational component 48 is fluidly connected to the passage 38 formed in sleeve-type flange 26 and passes through the opening 40 defined in the flange 42 of the hub 16. To protect conduit 52, a grommet or bushing 54 may be provided in the opening 40 or opening 40 may be defined by a bore in a wheel stud. Of course, alternatively, an internal passage may be provided in hub 16 opening to the outboard side of flange 42. Accordingly, initial installation and/or retrofit of system 10 to a vehicle is considerably simplified and will not weaken the load supporting structures of the axle housing and wheel hub. It is also noted that the rotary seals 28 and 30 and the conduit 50 leading to the wheel end assembly may be located at an inboard relatively protected location on the vehicle.

Rotating component 48 of system 10 includes the modular wheel end valve assembly 11 of the present invention, which assembly includes at least low pressure shutoff valve structure and control valve structure. The rotating component 48 also includes a manual inflate and pressure check valve 60. Valve assembly 11 may be located interiorly of tire 12.

A manifold portion 62 of conduit 52 connects port 66 of valve assembly 11 with the conduit 50 via chamber 32 while a manifold conduit 68 interconnects port 72 of valve assembly 11, the manual inflate and check valve 60, and the interior chamber 74 of the inflatable pneumatic tire 12. If dual tires are utilized, manifold conduit 68 may be split downstream of the valve 60 and manual shut-off valves provided to isolate the tires if required. Alternatively, line 62 may be split and a separate valve 11 provided for each tire of the dual tire set.

The initial inflate and pressure check valve 60 is located in manifold conduit 68, or may be located directly in the tire rim, and is located downstream of the valve assembly 11 for direct fluid communication to the interior chamber 74 of tire 12. Initial inflate and pressure check valve is of a standard tire valve stem construction as is well known in the prior art. It is important to note that valve assembly 11, which is located at the wheel end assembly, utilizes structures wherein venting to atmosphere thereof occurs solely through the manifold portion 62 of conduit 52, as will be described in greater detail below, and thus the valve assembly 11 will not be subject to clogging due to contamination by water, mud, snow or sand and/or may be located within the tire 12.

The relatively stationary portion 46 of the central tire inflation system 10 is mounted at convenient points on the vehicle chassis, preferably above the fording level of the vehicle, and is fluidly connected to the rotating portion 48 by means of a single conduit 50 and a single rotating seal chamber 32.

The relatively stationary portion 46 includes a source of pressurized fluid 142 which is typically the vehicle air system compressor, or, preferably, a pressurized air reservoir supplied by the compressor.

The source of pressurized fluid supplies compressed air, typically at a pressure not exceeding about 120 psi, to a split conduit 144 which defines branches 146 and 148 leading to the inlets 150 and 152, respectively, of inflate valve 154 and pressure regulator 156, respectively. Pressure regulator 156 defines an outlet 158 connected to a conduit 160 leading to the outlet 162 of deflate valve 164. The outlet 166 of inflate valve 154 and inlet 168 of deflate valve 164, respectively, are connected to a manifold conduit 170. Manifold conduit 170 is also connected to the inlet 172 of shutoff valve 174. Shutoff valve 174 has an outlet 176 connected to atmosphere. Manifold conduit 170 is also connected to port 178 of quick-release valve 180. A pressure transducer 186 is exposed to the pressure in conduit 170 by means of a branch conduit 188.

Quick-release valve 180 defines a port 182 connected to exhaust and a port 184 connected to the conduit 50 leading to the wheel end assembly.

Pressure regulator 156 may be of any conventional design and will limit pressure in conduit 160 to a relatively low pressure of about 8-10 psi, and further includes a relief port 190 leading to exhaust. Accordingly, it may be seen that the inlet 150 to the inflation valve 154 is exposed to supply pressure while the outlet 162 of deflate valve 164 is in communication with a regulated pressure of about 8-10 psi. As will be seen, pressure regulator 156 regulates the quick-release valve 180 and thus regulates the minimum pressure to which system 10 will deflate tire 12.

Inflate valve 154, deflate valve 164 and shutoff valve 174 are each relatively small flow two-way valves, preferably solenoid controlled valves, of conventional design. Valves 154, 164 and 174 have a first or closed position blocking fluid flow between the inlet and outlet ports thereof and a second or open position permitting fluid flow between the inlet and outlet ports thereof. Typically, the solenoid two-way valves 154 and 164 are spring biased to the closed positions thereof while valve 174 is spring biased to the open position thereof.

The operational characteristics of quick-release valve 180 are that a fluid flow (i.e. flow of higher pressurized fluid to a conduit or chamber at a lower pressurization) may be maintained from port 178 to port 184. However, a fluid flow may not be maintained from port 184 to port 178 as internal valve means will open port 184 to the exhaust port 182. Further, the valve 180, by establishing fluid communication from port 178 to port 184 and from port 184 to exhaust 182 will tend to cause the pressurization at port 178 (conduit 170) and the pressurization at port 184 (conduit 50) to equalize at the pressurization of the lower pressurized conduit.

It is important to note that quick-release valve 180, through which the various valves at the wheel end assemblies are vented, is located remote from the wheel end assembly and may also be located remotely from the control valves, solenoid valves 154, 164 and 174. Quick-release valve 180 may be remotely controlled by a single pressure line 170 fluidly connecting port 178 of valve 180 with the solenoid valves via manifold conduit 170. As will be described in greater detail below, a separate quick release valve structure may be provided at each axle or as a portion of an alternate embodiment of each wheel end valve assembly By controlling the pressurization in conduit 170, the minimum pressure to which conduits 50 and 52 and all chambers fluidly connected thereto will automatically be vented through the quick-release valve 180 is also controlled. During the deflation mode of operation of system 10, the quick-release valve will exhaust conduits 50 and 52, which are then connected to the tire chamber 74 through control valve 11, to a pressure equalling the regulated pressure from regulator 156. During system shut-down (steady state operation), tire chamber 74 is isolated from the conduit 52 by control valve 11 and conduit 170 is exhausted to atmosphere through shut-off valve 174 allowing conduits 50 and 52 and the seal chamber 32 to be exhausted to atmosphere through the quick-release valve 180.

The pressure transducer 186 may be of any commercially available design and provides a signal, preferably an electric signal, indicative of the pressure in conduit 170.

The structure and function of modular valve assembly 11 is disclosed in U.S. Pat. No. 4,678,017 and may best be appreciated by reference to FIGS. 1, 2, and 7. Wheel valve assembly 11 is comprised of three modules or sections 202, 204 and 206 which are clamped together by suitable fasteners such as machine screws 208. The assembly 11 defines a valve body 212 having only two exterior fluid connections or ports 66 and 72. Port 66 for connection to conduit 62 and supply conduit 52 is provided in module 206. Port 72 for connection to conduit 68 and the interior chamber 74 of tire 12 is provided in module 204.

Valve assembly body 212 defines a central valve chamber 214 divided into a lower portion 216 and an upper portion 218 by a plug type diaphragm 220. Generally, the upper valve chamber portion 218 is provided in cover module 202.

Inlet or control port 66 fluidly communicates with the lower chamber portion 216 via aligned passages 222 and 224 defined in modules 206 and 204, respectively. The lower chamber portion 216 communicates with the tire port 72 through an annular valve seat 226 which is opened and closed by the plug portion 228 of plug type diaphragm 220. Valve seat 226 is defined by the upward opening of a vertically extending bore 230 defined in module 204 which connects to a generally horizontally extending bore 232 in module 204 which connects with port 72. Preferably ports 66 and 72 are provided with internal pipe threads or the like.

A compression spring 234 acts on a spring seat 236 to bias the plug portion 228 of diaphragm 220 against the valve seat 226 with a force sufficient to normally maintain a blockage of fluid flow between lower chamber portion 216 (and port 66) and passages 230 and 232 (and port 72). Plug portion 228 and valve seat 226 of valve 11 assembly thus define a normally closed valve interposed the conduit 62 and the conduit 68 connected to the interior 74 of tire 12.

The bias of spring 234 can be overcome when the pressure in conduit 230, which is substantially equal to pressure in tire chamber 74, acting on the underside surface 238 of the plug portion 228 exceeds a predetermined reference valve. Valve 11 thus acts to automatically vent chamber 74 to conduit 62 in the event of greater than maximum allowable pressurization of tie 12 as might occur during manual inflation of the tire through fill valve 60. Preferably, spring 234 and surface 238 are selected such that a pressure of about 100 p.s.i. (pounds per square inch) will move plug 228 off of valve seat 226.

Diaphragm 220 defines a lower surface 240 exposed to fluid pressure at port 66 and in lower chamber portion 216 and an upper surface 242 which is exposed to fluid pressure in upper chamber portion 218. An annular valve seat 244, defined in module 202, is sealed by the outer periphery 246 of the diaphragm 220 under the bias of spring 248 acting on diaphragm plate/retainer 250 to normally fluidly separate the upper and lower portions, 216 and 218, of the valve chamber 214. A pressure of about 20 psi at port 66, assuming chamber portion 218 is not fluidly connected to inlet port 66, acting on the under surface 240 of diaphragm 220 will lift the plug member 228 off of the seat 226 communicating ports 72 and 66 for establishing fluid communication between the tire and stationary portion 46. As pressure at port 66 drops to below about 7 psi, spring 234 will again cause plug portion 228 to sealingly engage seat 226 to close the valve assembly 11. Accordingly, at less than about 7 psi pressure in conduits 50 and 52, the valve 11 will be closed and at pressures above 20 psi, the valve 11 will be open between ports 66 and 72. Accordingly, selective pressurization of single conduit 62 is effective to control the opening and closing of valve 11 as well as providing pressurized fluid for the inflation of tire 12 and/or a low pressure exhaust conduit for the deflation of tire 12.

Valve assembly 11 is effective to sense pressurization of tire chamber 74 falling below a predetermined minimum reference value and to fluidly isolate the tire 12 from the remainder of the CTIS system, by biasing valve assembly 11 closed, in the event such less than minimum reference pressure condition is sensed.

A pair of relatively closely spaced, substantially parallel passages 254 and 256 both open to the upper surface 258 of assembly module 206 to define a second and a third valve seat, 260 and 262, respectively. Passage 254 is in fluid communication with control/supply port 66 via passage 264 formed in module 206 while passage 256 is in fluid communication with the upper valve chamber portion 218 and the upper surface 242 of plug type diaphragm 220 via passages 266, 268, 270, 272, 274 and 276.

Fluid communication between the valve seats 260 and 262 is normally blocked by the under surface 278 of a flat type diaphragm 280 received between the lower surface 282 of module 204 and upper surface 258 of module 206. Surfaces 258 and 282 define the interface 284 between module 204 and 206. The upper surface 286 of flat diaphragm 280 is exposed to fluid pressure in a chamber 288 formed in the lower surface 282 and fluidly communicating with the tire port 72 via passages 232 and 230. Upper surface 286 of diaphragm 280 is thus exposed to tire pressure in chamber 74 of tire 12.

The surface area of the upper surface 286 of diaphragm 280 exposed to tire pressure at port 72 is sized to be at least ten to fifteen times as large as the surface area of the portion of lower surface 278 exposed to supply pressure at port 66 (i.e. the area of seat 260). Accordingly, so long as at least a minimum pressure is present in tire chamber 74, even a ten to fifteen times greater supply pressure in manifold 62 communicating with port 66 will not cause communication between passages 254 and 256 Assuming the supply pressure at port 66 is never to exceed 110 psi, a pressure of greater than than 7 psi in the tire and in conduit 68 will maintain flat diaphragm 280 closed, i.e. seated on valve seat 260. However, in the event of extensive damage to tire 12 rendering the tire incapable of maintaining at least a minimum pressurization, pressurization of the supply conduit 62 will result in flap diaphragm 280 lifting off of valve seat 260 and fluidly communicating passages 254 and 256 which will cause supply pressure to be applied via conduits 264, 254, 256, 266, 268, 270, 272, 274 and 276 to the upper chamber portion 218. Supply pressure acting on the upper surface 242 of the diaphragm 220 will cause valve 11 to remain in the closed position blocking communication between port 66 and 72 thus automatically isolating the damaged tire. Thus, loss of system supply air through a damaged tire unable to maintain at least a predetermined minimum pressurization will be prevented allowing the remainder of the tire inflation system to inflate the remaining tires in a normal manner. When the tire inflation system is shut down, pressure on top of the diaphragm 220 acting on surface 242 bleeds off around the outer periphery 244 and valve seat 244. Of course, for the system to operate, an initial tire pressure above the minimum tire pressure, 7 psi for example, must be provided to the tire 12 through the initial inflate and pressure check valve 60

It is important to note that valve assembly 11 utilizes only diaphragm type valving elements (i.e. not spools or the like) and that the diaphragms, 220 and 280, are located at the interfaces of modules 202 and 204 and of modules 204 and 206, respectively. Seals 294 and 296 are also utilized at the interfaces of modules 204 and 206 and 202 and 204.

The operation of the pneumatic components of central tire inflation system 10 is as follows Under normal or steady state conditions, i.e. when tire inflation system 10 is not activated, the interior chamber 74 of tire 12, and thus manifold conduit 68, will be pressurized to some pressurization level greater than the minimum pressurization level, such as, for example, 75 psi for highway travel, 30 psi for cross country travel or 20 psi for operation in sand, mud or snow. If the pressurization of tire 12 is below the minimum pressure level (such as 7 psi) the tire must be pressurized to at least a minimum pressurization level by means of the manual inflate and pressurization check valve 60. In the steady state condition, the inflation valve 154 and the deflate valve 164 are closed and the shutoff valve 174 is open. Under these conditions, supply pressure is present in conduit 144 and regulated pressure is present in conduit 160. When the shutoff valve is open, conduit 170 is vented and port 178 of quick release valve 180 is exposed to atmospheric pressure only. Whatever pressure may be present in conduits 62, 52 and 50 will be vented to atmosphere as a result of such pressure acting at port 184 causing connecting conduit 50 to exhaust through ports 184 and 182 of quick-release valve 180. As manifold portion 62 of conduit 52 is vented to atmosphere, there will be only atmospheric pressure present in port 66 of valve 11 and thus port 72 of valve 11 will be sealed to isolate the conduit 68 and the tire 12 at tire inflation pressure from the remainder of the system. As conduits 52 and 50 are vented through quick-release valve 180, the rotary seals 28 and 30 defining seal chamber 32 are exposed to atmospheric or substantially atmospheric pressure on both sides thereof.

In accordance with the invention and as shown in FIGS. 3 and 4, the valve assembly 11 is provided with a one way or check valve 300 made of a suitable rubber or elastomeric material. The valve 300 is provided with a central hole 302 extending from the flanged based 304 and terminating in a pair of lips 306. The base 304 of the valve is positioned within a countersunk hole 308 formed in the valve section 206. The hole 308 is positioned between the flap diaphram 280 and the conduit 268 with the hole 302 and the valve 300 communicating with the conduit 266 of the isolation circuit including conduits 264, 254, 256, 266, 268, 270, 272, 274 and 276 as well as the upper chamber portion 218. The base flange 310 of the valve 300 is held in place within the hole 308 by the lower periphery 312 of the hole 314 formed in the wall 316. The check valve 300 is normally opened, that is the lips 306 are not sealed by reason of the resiliency of the elastomeric material from which the valve is made. As a result, when the pressure in chamber 318 or 302 increases or decreases slowly due to temperature or atmospheric pressure changes, the lips 306 remain apart and communication is maintained between the chamber 318 and conduit 266. Thus, the normally opened check valve 300 reduces the effects of temperature and atmospheric pressure on the performance of the wheel valve by maintaining a constant zero reference pressure differential between chamber 318 and conduit 266. However, should the pressure within the chamber 318 be rapidly increased, the lips 306 are forced together into sealing relationship, valve 300 is closed and communication is eliminated between the conduit 266 and the chamber 318, and hence to the port 66 and the control circuit. Pressure acting on the underside surface 240 of diaphragm 220 will lift the plug member 228 off of the seat 226 establishing communication between ports 72 and 66.

Another embodiment of the invention is shown in FIGS. 5 and 6 in which the valve assembly 11 is provided with a check valve 400 having a rubber or elastomeric diaphragm 402 which is disc shaped in plan view. The periphery 404 of the diaphragm 402 is clamped and sealed between an 0-ring 406 and the sealing flange 408 formed in the module 206. The diaphragm 402 is of relatively uniform-thickness and is provided with an orifice 410 of substantially uniform diameter.

The check valve 400 also includes a fixed valve member 412 having a flat valve seat 414 formed integrally with the module 206. The fixed valve member 412 and closure 414 are positioned so that the valve seat 414 is axially aligned with the orifice 410. The chamber 416 surrounding the valve member 412 communicates with the conduit 266 by vent holes 418.

The check valve 400 is normally opened as shown in FIGS. 5 and 6 of the drawings so that differences in air pressure between the chambers 318 and 218, due to temperature or atmospheric pressure changes, are equalized. Such pressure changes occur slowly and do not flex the diaphragm 402 so that air pressure from chamber 318 may flow from the hole 314 through the orifice 410 and hence into the chamber 416, through the holes 418 in the valve section 206, and hence to the conduit 266 of the isolation circuit which includes conduits 264, 254, 256, 266, 268, 270, 272, 274 and 276 communicating with the upper chamber 218. Air pressure may also flow from the upper chamber 218 to the chamber 318. Thus, the normally open check valve 300 reduces the effects of temperature and atmospheric pressure on the performance of the wheel valve 11 by maintaining a constant zero reference pressure differential between the chambers 318 and 218.

Figure 1:
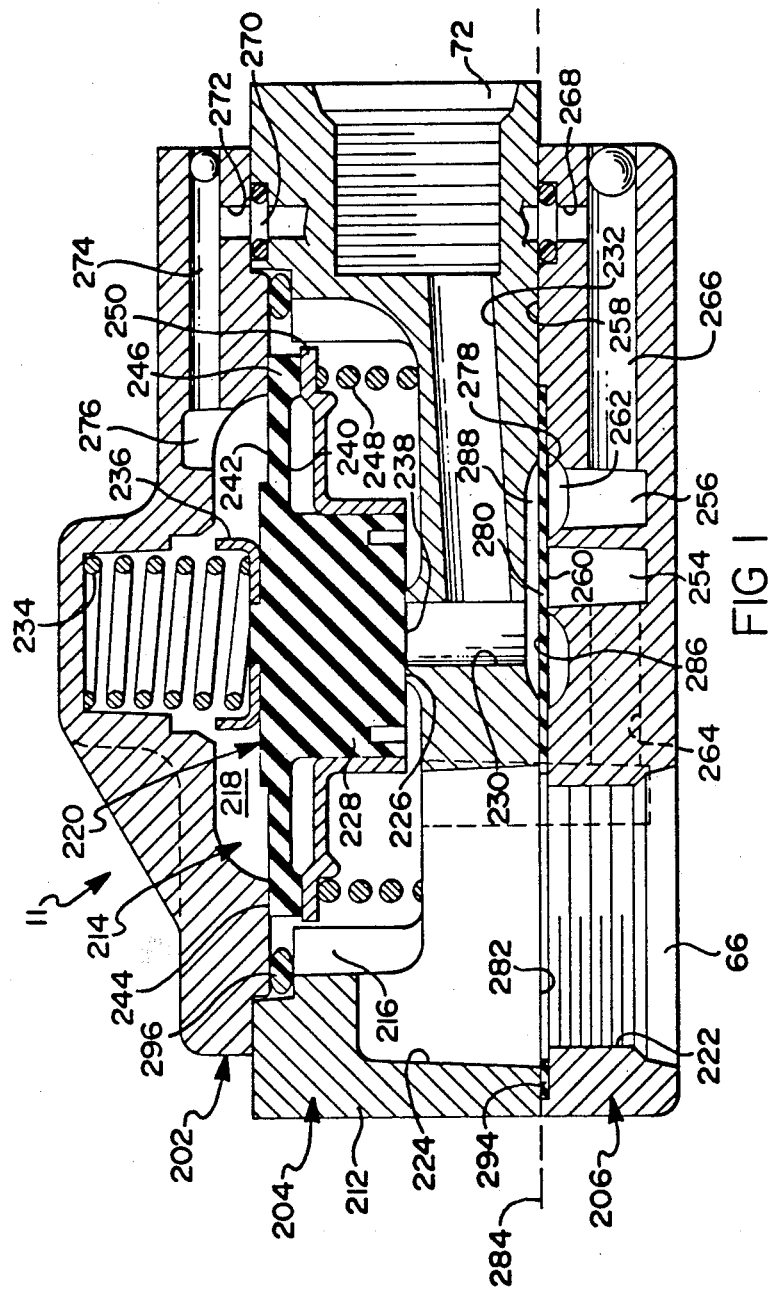
FIG. 1 is a front view, in section, of an embodiment of the wheel end valve assembly of the present invention taken along lines 1—1 in FIG. 2.
Figure 2:
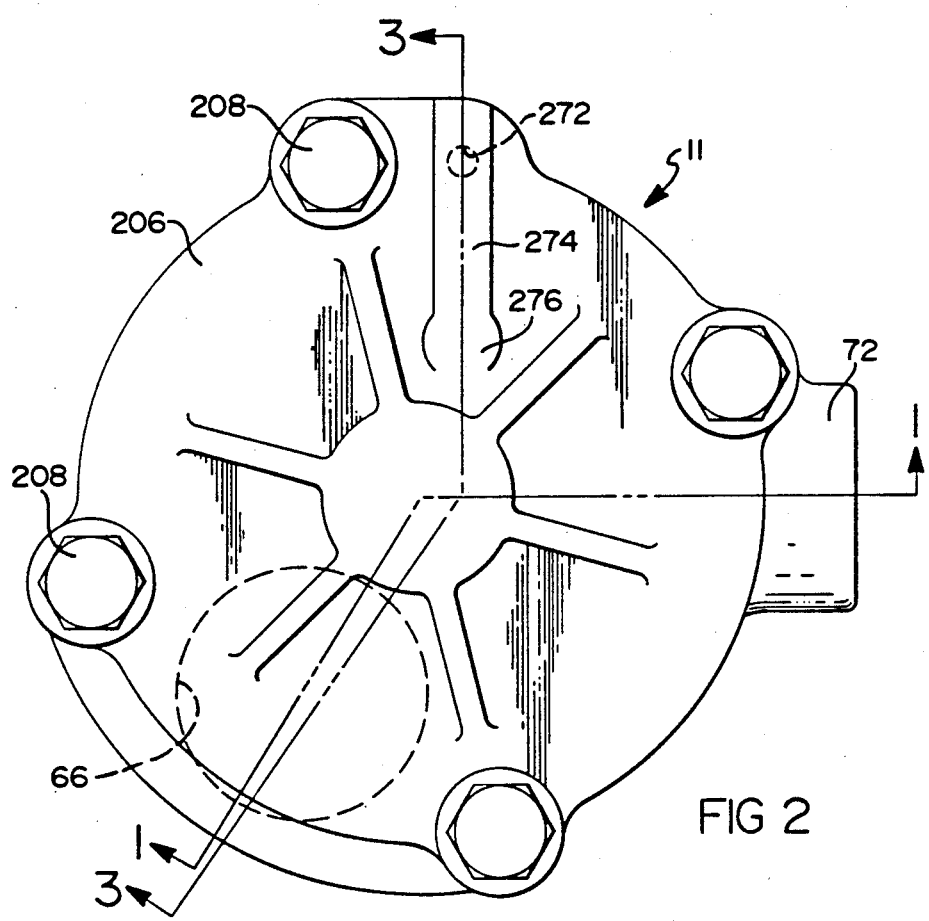
FIG. 2 is a top view of the valve assembly illustrated in FIG. 1.

Whenever the pressure within the chamber 318 is rapidly increased to move the diaphragm 220 off of the seat 226 and thus open fluid communication between the port 66 and 72 of the valve 11 shown in FIG. 1. Such rapid increase in pressure in the chamber 318 will cause the diaphragm 402 to flex in a direction toward the fixed valve member 412 into the position shown by dotted lines in FIG. 3. When the diaphragm 402 is flexed as shown by the dotted lines, the portion of the diaphram 402 adjacent the orifice 410 is moved into sealing engagement with the valve seat 414 thereby closing the orifice 410 and cutting off communication between the chamber 318 and the isolation circuit leading to the chamber 218. Thus, as the diaphragm 402 is flexed, the check valve 400 is closed. Pressure may then build up in chamber 318 sufficiently large to open the valves 11 to establish communication between the port 66 and the tire port 72.

Although the preferred embodiments of the present invention has been described with a certain degree of particularity, it is understood, that certain substitutions and rearrangements of the parts may be resorted to without departing from the spirit and scope of the present invention.

I claim:

1. A wheel end valve assembly for a central tire inflation system comprising a valve body having a first fluid connection defined by a first port for connection to a selectively pressurized and exhausted conduit, a second fluid connection defined by a second port for connection to the interior pressurized chamber of an inflatable tire, said valve assembly comprising first valve means responsive to pressurization of said selectively pressurized and exhausted conduit to assume a first position for establishing fluid communication between said first and second ports and responsive to exhausting to atmosphere of said selectively pressurized and exhausted conduit to assume a second position for blocking fluid communication between said first and second ports thereof, said first valve means comprising a valve member having a first surface exposed to fluid pressure at said first port and an opposed second larger surface, said valve assembly comprising second valve means constantly in fluid communication with said second port and responsive to a sensed pressurization of said interior chamber of said tire being less than a predetermined minimum reference pressure and an isolation circuit to conduct fluid from said first port past said second valve means to said second large surface to maintain said first valve means in said second position thereof in response to said sensed pressurization of said tire being less than said minimum reference pressure, said assembly characterized by:

a normally opened third valve means in fluid communication with said first port and said isolation circuit thereby maintaining a zero reference pressure differential between said first port and said second larger surface, said third valve means being responsive to a rapid increase in pressure at said first port to close said third valve means and thereby permit said first valve means to open.

2. A wheel end valve assembly as claimed in claim 1 in which said third valve means is made of an elongated elastomeric material having a central hole terminating in a pair of lips which are normally spaced apart, said lips being forced together into sealing relationship upon a rapid increase in pressure at said first port to close said third valve means.

3. A wheel end valve assembly as claimed in claim 1 in which said third valve means comprises a diaphragm sealed around its periphery, an orifice in said diaphragm permitting fluid communication with said first port and said isolation circuit, said third valve means including a valve seat spaced from and axially aligned with said orifice whereby said diaphram is flexed upon a rapid increase in pressure at said first port to cause said diaphragm to seal against said valve seat and close said orifice to thereby permit said first valve means to open.

4. A wheel end valve assembly as claimed in claim 3 in which said diaphragm is of uniform thickness and said orifice is located centrally of said diaphragm.

* * * * *